United States Patent
Liou et al.

(10) Patent No.: US 10,096,146 B2
(45) Date of Patent: Oct. 9, 2018

(54) MULTIPLE VISUAL REPRESENTATIONS OF LIGHTING EFFECTS IN A COMPUTER ANIMATION SCENE

(71) Applicant: DreamWorks Animation LLC, Glendale, CA (US)

(72) Inventors: Tsuey Jin Liou, Sunnyvale, CA (US); Evan P. Smyth, Glendale, CA (US); Andrew Philip Pearce, Oakland, CA (US); Peter McNerney, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 0 days.

(21) Appl. No.: 15/486,232

(22) Filed: Apr. 12, 2017

(65) Prior Publication Data

US 2017/0287197 A1  Oct. 5, 2017

Related U.S. Application Data

(63) Continuation of application No. 13/843,980, filed on Mar. 15, 2013, now Pat. No. 9,659,398.

(51) Int. Cl.
*G06T 13/80* (2011.01)
*G06T 13/20* (2011.01)
(Continued)

(52) U.S. Cl.
CPC .............. *G06T 13/80* (2013.01); *G06T 13/20* (2013.01); *G06T 15/20* (2013.01); *G06T 15/506* (2013.01); *G06T 19/20* (2013.01)

(58) Field of Classification Search
None
See application file for complete search history.

(56) References Cited

U.S. PATENT DOCUMENTS 4,922,413 A    5/1990 Stoughton et al.
5,307,295 A    4/1994 Taylor et al.
(Continued)

FOREIGN PATENT DOCUMENTS

CN    101916324 A    12/2010
CN    102053989 A     5/2011
(Continued)

OTHER PUBLICATIONS

Online ragdoll effect https://forums.svencoop.com/archive/index.php/t-26575.html.*
(Continued)

*Primary Examiner* — Jason Pringle-Parker
(74) *Attorney, Agent, or Firm* — Dentons US LLP

(57) ABSTRACT

Computer animation tools for viewing, in multiple contexts, the effect of changes to a computer animation are disclosed. An artist configures multiple visual displays in the user interface of a computer animation system. A visual display shows one or more frames of computer animation. An artist configures a visual display to reflect a specific context. For example, the artist may assign a particular virtual viewpoint of a scene to a particular visual display. Once visual displays are configured, the artist changes a configuration of the computer animation. For example, the artist may change the lighting parameters of a scene. In response, the visual displays show the visual effects of the configuration (e.g., lighting parameters) change under corresponding contexts (e.g., different virtual camera viewpoints). Using multiple visual displays, which may be displayed side-by-side, an artist can view the effects of her configuration changes in the various contexts.

30 Claims, 5 Drawing Sheets

(51) Int. Cl.
   *G06T 15/20* (2011.01)
   *G06T 15/50* (2011.01)
   *G06T 19/20* (2011.01)

(56) References Cited

U.S. PATENT DOCUMENTS

| | | | |
|---|---|---|---|
| 5,329,360 A | 7/1994 | Gillard et al. | |
| 5,438,661 A | 8/1995 | Ogawa | |
| 5,675,752 A | 10/1997 | Scott et al. | |
| 5,808,617 A | 9/1998 | Kenworthy et al. | |
| 5,808,625 A | 9/1998 | Picott et al. | |
| 5,896,139 A | 4/1999 | Strauss | |
| 5,936,628 A | 8/1999 | Kitamura et al. | |
| 5,982,389 A | 11/1999 | Guenter et al. | |
| 5,986,667 A | 11/1999 | Jevans | |
| 6,154,215 A | 11/2000 | Hopcroft et al. | |
| 6,243,856 B1 | 6/2001 | Meyer et al. | |
| 6,252,608 B1 | 6/2001 | Snyder et al. | |
| 6,263,103 B1 | 7/2001 | Freeman et al. | |
| 6,272,650 B1 | 8/2001 | Meyer et al. | |
| 6,362,822 B1 | 3/2002 | Randel | |
| 6,496,190 B1 | 12/2002 | Driemeyer et al. | |
| 6,556,200 B1 | 4/2003 | Pfister et al. | |
| 6,611,262 B1 | 8/2003 | Suzuki | |
| 6,760,485 B1 | 7/2004 | Gilman et al. | |
| 6,919,891 B2 | 7/2005 | Schneider et al. | |
| 7,174,039 B2 | 2/2007 | Koo et al. | |
| 7,414,626 B1 | 8/2008 | Picott | |
| 7,439,982 B2 | 10/2008 | Deniau et al. | |
| 7,548,238 B2 | 6/2009 | Berteig et al. | |
| 7,911,472 B2 | 3/2011 | Harper | |
| 7,920,143 B1 | 4/2011 | Haratsch et al. | |
| 8,009,176 B2 | 8/2011 | Zimmer | |
| 8,259,110 B1 | 9/2012 | Carr et al. | |
| 8,274,506 B1 | 9/2012 | Rees | |
| 8,339,402 B2 | 12/2012 | Henson et al. | |
| 8,352,397 B2 | 1/2013 | Rubin et al. | |
| 8,352,443 B1 | 1/2013 | Polson et al. | |
| 8,369,564 B2 | 2/2013 | Hervas et al. | |
| 8,612,485 B2 | 12/2013 | Selan et al. | |
| 8,624,898 B1 | 1/2014 | Bugaj et al. | |
| 8,773,433 B1 | 7/2014 | Smyrl | |
| 2001/0027388 A1 | 10/2001 | Beverina et al. | |
| 2002/0010026 A1* | 1/2002 | York | A63F 13/02 463/47 |
| 2002/0063704 A1 | 5/2002 | Sowizral et al. | |
| 2002/0099684 A1 | 7/2002 | Ardoin et al. | |
| 2002/0128841 A1 | 9/2002 | Kibre et al. | |
| 2002/0140707 A1 | 10/2002 | Samra et al. | |
| 2002/0163518 A1 | 11/2002 | Rising, III et al. | |
| 2002/0188613 A1 | 12/2002 | Chakraborty et al. | |
| 2003/0156117 A1 | 8/2003 | Higuchi et al. | |
| 2004/0052450 A1 | 3/2004 | Morrison | |
| 2004/0109501 A1 | 6/2004 | Wellborn | |
| 2004/0160445 A1 | 8/2004 | Whatmough | |
| 2004/0189668 A1 | 9/2004 | Beda et al. | |
| 2004/0194020 A1 | 9/2004 | Beda et al. | |
| 2004/0222989 A1 | 11/2004 | Zhang et al. | |
| 2004/0222992 A1 | 11/2004 | Calkins et al. | |
| 2005/0039176 A1 | 2/2005 | Fournie et al. | |
| 2005/0110790 A1 | 5/2005 | D'Amora | |
| 2005/0140672 A1 | 6/2005 | Hubbell | |
| 2005/0140694 A1 | 6/2005 | Subramanian et al. | |
| 2005/0248565 A1 | 11/2005 | Grassia et al. | |
| 2005/0253839 A1 | 11/2005 | Bugaj et al. | |
| 2005/0256950 A1 | 11/2005 | Suzuki | |
| 2005/0262470 A1 | 11/2005 | Gavrilov | |
| 2006/0176403 A1 | 8/2006 | Gritton et al. | |
| 2007/0080964 A1 | 4/2007 | Kainz et al. | |
| 2007/0146361 A1 | 6/2007 | Hayashi et al. | |
| 2007/0176926 A1 | 8/2007 | Garcia et al. | |
| 2007/0185881 A1 | 8/2007 | Vienneau et al. | |
| 2008/0028414 A1 | 1/2008 | Couture-Gagnon et al. | |
| 2008/0049033 A1 | 2/2008 | Yang | |
| 2008/0109717 A1 | 5/2008 | Krauter | |
| 2008/0117216 A1 | 5/2008 | Dorie | |
| 2008/0122838 A1 | 5/2008 | Hoover et al. | |
| 2008/0231633 A1 | 9/2008 | Keller et al. | |
| 2008/0238916 A1 | 10/2008 | Ghosh et al. | |
| 2008/0278482 A1 | 11/2008 | Farmanbar et al. | |
| 2009/0021513 A1 | 1/2009 | Joshi et al. | |
| 2009/0027380 A1 | 1/2009 | Rajan et al. | |
| 2009/0292640 A1* | 11/2009 | Heatherly | A63F 13/12 705/51 |
| 2010/0079462 A1 | 4/2010 | Breeds et al. | |
| 2010/0086200 A1 | 4/2010 | Stankiewicz et al. | |
| 2010/0123723 A1 | 5/2010 | Collard et al. | |
| 2010/0134501 A1 | 6/2010 | Lowe et al. | |
| 2010/0177104 A1 | 7/2010 | Dufour et al. | |
| 2010/0214284 A1 | 8/2010 | Rieffel et al. | |
| 2010/0214313 A1 | 8/2010 | Herman et al. | |
| 2010/0289804 A1 | 11/2010 | Jackman et al. | |
| 2010/0302249 A1 | 12/2010 | Fowler et al. | |
| 2010/0322358 A1 | 12/2010 | Drumm et al. | |
| 2011/0090236 A1 | 4/2011 | Calsyn et al. | |
| 2011/0106843 A1 | 5/2011 | Pan et al. | |
| 2011/0111859 A1* | 5/2011 | Fiedler | A63F 13/10 463/42 |
| 2011/0181606 A1 | 7/2011 | Sumner et al. | |
| 2011/0182479 A1 | 7/2011 | Sese et al. | |
| 2011/0206200 A1 | 8/2011 | Sovio et al. | |
| 2011/0234587 A1 | 9/2011 | Maigret et al. | |
| 2011/0316854 A1 | 12/2011 | Vandrovec | |
| 2012/0017236 A1* | 1/2012 | Stafford | A63F 13/00 725/32 |
| 2012/0095745 A1 | 4/2012 | Le Guevei-Scholtens et al. | |
| 2012/0113125 A1 | 5/2012 | Guerrab et al. | |
| 2012/0166446 A1 | 6/2012 | Bowman et al. | |
| 2012/0280991 A1 | 11/2012 | Maloney et al. | |
| 2012/0280995 A1 | 11/2012 | Anderson | |
| 2012/0284664 A1 | 11/2012 | Zhao | |
| 2013/0063460 A1 | 3/2013 | Marison et al. | |
| 2013/0063472 A1 | 3/2013 | Marison et al. | |
| 2013/0090850 A1 | 4/2013 | Mays | |
| 2013/0120421 A1 | 5/2013 | Maguire | |
| 2013/0120422 A1 | 5/2013 | Rao et al. | |
| 2013/0127891 A1 | 5/2013 | Kim et al. | |
| 2014/0035908 A1 | 2/2014 | Powell et al. | |
| 2014/0059564 A1 | 2/2014 | Vigneras et al. | |
| 2014/0108485 A1 | 4/2014 | Geibel et al. | |
| 2015/0042654 A1 | 2/2015 | Segasby et al. | |

FOREIGN PATENT DOCUMENTS

| | | | |
|---|---|---|---|
| EP | 1918880 A2 | 5/2008 | |
| EP | 1918881 A2 | 5/2008 | |
| EP | 1990776 A2 | 11/2008 | |
| EP | 2187355 A1 | 5/2010 | |
| EP | 2779100 A1 | 9/2014 | |
| WO | 2001/63561 A1 | 8/2001 | |
| WO | 2005/114587 A1 | 12/2005 | |
| WO | 2005/114589 A1 | 12/2005 | |
| WO | 2006/094199 A2 | 9/2006 | |
| WO | 2007/005739 A2 | 1/2007 | |
| WO | 2007/146800 A2 | 12/2007 | |
| WO | 2007/146800 A3 | 11/2008 | |
| WO | 2010/035141 A2 | 4/2010 | |
| WO | 2012/174128 A1 | 12/2012 | |
| WO | 2013/036691 A1 | 3/2013 | |

OTHER PUBLICATIONS

The beginning of waffle and cobra (l4d split screen pc) https://www.youtube.com/watch?v=d59VrXvdmxs.*

Adamsen, Mikkel, "ReRendering", Available at <http://image.diku.dk/projects/media/mikkel.adamsen.07.pdf>, Sep. 24, 2007, 19 pages.

Advisory Action received for U.S. Appl. No. 13/843,695, dated Aug. 5, 2015, 2 pages.

Advisory Action received for U.S. Appl. No. 13/843,980, dated Jan. 5, 2016, 8 pages.

Advisory Action received for U.S. Appl. No. 13/844,497, dated Mar. 16, 2016, 4 pages.

(56) References Cited

OTHER PUBLICATIONS

Barrett et al., "A Monotonic Superclass Linearization for Dylan", Oopsla, Jun. 28, 1996. pp. 69-82.
Barzel, Ronen, "Lighting Controls for Computer Cinematography", Journal of Graphics Tools, vol. 2, No. 1, Jan. 1, 1997, 19 pages.
Bederson et al., "Toolkit Design for Interactive Structured Graphics", IEEE Transactions on Software Engineering, vol. 30, No. 8, Aug. 2004, pp. 535-546.
Bittner et al., "Coherent Hierarchical Culling: Hardware Occlusion Queries Made Useful", Eurographics, vol. 23, No. 3, Sep. 2004, 10 pages.
Carstarphen, John, "Lighting Effects in Cinema 4D Animation", available online at <http://www.ehow.com/video_4444919_lighting-effects-cinema-4d-animation.html>, retrieved on Apr. 30, 2013, 2 pages.
Dobos et al., "3D Revision Control Framework", Web3D, 2012, pp. 121-129.
Dollner et al., "Object-Oriented 3D Modelling, Animation and Interaction", The Journal of Visualization and Computer Animation, vol. 8, 1997, pp. 33-64.
Ex-Parte Quayle Action received for U.S. Appl. No. 13/831,482, dated Nov. 24, 2014, 7 pages.
Extended European Search Report (includes European Search Report and Search Opinion) received for European Patent Application No. 14159965.4, dated Jul. 20, 2016, 16 pages.
Extended European Search Report (includes Supplementary European Search Report and Search Opinion) received for European Patent Application No. 14160115.3, dated Jul. 28, 2015, 6 pages.
Extended European Search Report (includes Supplementary European Search Report and Search Opinion) received for European Patent Application No. 14160119.5, dated Jun. 30, 2015, 11 pages.
Extended European Search Report received for European Patent Application No. 14159928.2, dated Mar. 22, 2016, 15 pages.
Extended European Search Report received for European Patent Application No. 14160002.3, dated Dec. 3, 2015, 10 pages.
Extended European Search Report received for European Patent Application No. 14160117.9, dated May 26, 2014, 7 pages.
Extended European Search Report received for European Patent Application No. 14159918.3, dated Nov. 12, 2015, 8 pages.
Final Office Action received for U.S. Appl. No. 13/831,309, dated Jun. 5, 2015, 8 pages.
Final Office Action received for U.S. Appl. No. 13/843,695, dated Apr. 19, 2016, 9 pages.
Final Office Action received for U.S. Appl. No. 13/843,695, dated Feb. 23, 2015, 21 pages.
Final Office Action received for U.S. Appl. No. 13/843,980 dated Sep. 2, 2015, 20 pages.
Final Office Action received for U.S. Appl. No. 13/843,980, dated Sep. 22, 2016, 22 pages.
Final Office Action received for U.S. Appl. No. 13/844,363, dated Aug. 6, 2015, 12 pages.
Final Office Action received for U.S. Appl. No. 13/844,424, dated Apr. 7, 2015, 10 pages.
Final Office Action received for U.S. Appl. No. 13/844,497, dated Sep. 28, 2015, 28 pages.
Fisher et al., "Characterizing Structural Relationships in Scenes Using Graph Kernels", ACM Siggraph 2011 papers, XP055222613, Vancouver, British Columbia, Canada, Aug. 7, 2011, 11 pages.
Gould, David, "Complete Maya Programming—An Extensive Guide to Mel and C++ API", The Morgan Kaufmann Series in Computer Graphics and Geometric Modelling, 2003, 51 pages.
Illinois Simulator Lab, "Syzygy Documentation: Programming and Application Frameworks", available online at <http://syzygy.isl.uiuc.edu/szg/doc/Programming.html>, retrieved on Apr. 30, 2013, Dec. 17, 2012, 11 pages.
"Intro to Animation", Power Point Presentation available at <http://visservices.sdsc.edu/courses/maya/spring06/introtoanim.ppt> accessed on Apr. 30, 2013, 32 pages.

International Preliminary Report on Patentability received for PCT Patent Application No. PCT/US2014/026792, dated Sep. 24, 2015, 6 pages.
International Preliminary Report on Patentability received for PCT Patent Application No. PCT/US2014/026799, dated Sep. 24, 2015, 8 pages.
International Search Report & Written Opinion received for PCT Patent Application No. PCT/US2014/026799, dated Sep. 26, 2014, 11 pages.
International Search Report and Written Opinion received for PCT Patent Application No. PCT/US2014/026792, dated Aug. 11, 2014, 7 pages.
Invitation to Pay Additional Fees received for PCT Patent Application No. PCT/US2014/026799, dated Jul. 25, 2014, 2 pages.
"JUNG (Java Universal Network/Graph) Framework Manual, Filtering", available online at <http://jung.sourceforge.net/doc/manual.html#filter>, retrieved on Apr. 30, 2013, 13 pages.
Li et al., "High-Extensible Scene Graph Framework Based on Component Techniques", Journal of Zhejiang University Science A, vol. 7, No. 7, 2006, pp. 1247-1252.
Lu et al., "Knowledge-Based Digital Media Processing: Generic Object Registration using Multiple Hypotheses Testing in Partition Trees", IEE Proc.-Vis. Image Signal Process, vol. 153, No. 3, Jun. 2006, pp. 323-330.
Non-Final Office Action received for U.S. Appl. No. 13/843,695, dated Oct. 22, 2014, 16 pages.
Non-Final Office Action received for U.S. Appl. No. 13/843,980, dated Feb. 5, 2015, 15 pages.
Non-Final Office Action received for U.S. Appl. No. 13/844,016, dated Feb. 5, 2015, 23 pages.
Non-Final Office Action received for U.S. Appl. No. 13/831,309, dated Feb. 24, 2015, 8 pages.
Non-Final Office Action received for U.S. Appl. No. 13/831,482, dated Apr. 20, 2015, 8 pages.
Non-Final Office Action received for U.S. Appl. No. 13/843,980, dated Mar. 16, 2016, 24 pages.
Non-Final Office Action received for U.S. Appl. No. 13/844,113, dated Apr. 10, 2015, 10 pages.
Non-Final Office Action received for U.S. Appl. No. 13/844,363, dated Feb. 24, 2015, 9 pages.
Non-Final Office Action received for U.S. Appl. No. 13/844,380, dated Apr. 2, 2015, 9 pages.
Non-Final Office Action received for U.S. Appl. No. 13/844,424, dated Oct. 28, 2014, 10 pages.
Non-Final Office Action received for U.S. Appl. No. 13/844,497, dated Mar. 13, 2015, 21 pages.
Non-Final Office Action received for U.S. Appl. No. 13/843,695, dated Nov. 23, 2015, 27 pages.
Notice of Allowance received for U.S. Appl. No. 13/831,482, dated Aug. 31, 2015, 5 pages.
Notice of Allowance received for U.S. Appl. No. 13/831,482, dated Mar. 4, 2015, 5 pages.
Notice of Allowance received for U.S. Appl. No. 13/844,016, dated Aug. 21, 2015, 10 pages.
Notice of Allowance received for U.S. Appl. No. 13/844,424, dated Nov. 5, 2015, 10 pages.
Notice of Allowance received for U.S. Appl. No. 13/831,309, dated Jul. 21, 2015, 14 pages.
Notice of Allowance received for U.S. Appl. No. 13/843,980, dated Jan. 12, 2017, 5 pages.
Notice of Allowance received for U.S. Appl. No. 13/844,113, dated Jan. 29, 2016, 11 pages.
Notice of Allowance received for U.S. Appl. No. 13/844,113, dated May 10, 2016, 10 pages.
Notice of Allowance received for U.S. Appl. No. 13/844,363, dated Jun. 16, 2016, 7 pages.
Notice of Allowance received for U.S. Appl. No. 13/844,380, dated Jul. 17, 2015, 7 pages.
Notice of Allowance received for U.S. Appl. No. 13/844,016, dated Oct. 22, 2015, 2 pages.
Office Action received for European Patent Application No. 14160115.3, dated Mar. 15, 2017, 3 pages.

(56) References Cited

OTHER PUBLICATIONS

Oishi et al., "Parallel Alignment of a Large Number of Range Images", Proceedings of the Fourth International Conference on 3-D Digital Imaging and Modeling (3DIM'03), IEEE Computer Society, 2003, 8 pages.
Open Inventor Toolkit Tutorial, "Chapter 3. Nodes and Groups and Chapter 4. Cameras and Lights", Available at <http://www-evasion.imag.fr/Membres/Francois.Faure/doc/inventorMentor/sgi_html/ch03.html>, retrieved on Oct. 18, 2013, 61 pages.
Partial European Search Report received for European Patent Application No. 14159965.4, dated Apr. 1, 2016, 9 pages.
Partial European Search Report received for European Patent Application No. 14714566.8, dated Aug. 1, 2016, 5 pages.
Pellacini et al., "A User Interface for Interactive Cinematic Shadow Design", ACM Transactions on Graphics, vol. 21. No. 3, Jul. 1, 2002, pp. 563-566.
"Perspective—Definition of Perspective by The Free Dictionary", Available at <www.thefreedictionary.com/perspective>, retrieved on Apr. 22, 2016, 5 pages.
"Perspective I Definition of Perspective by Merriam-Webster", available at <merriam-webster.com/dictionary/perspective>, retrieved on Apr. 22, 2016, 8 pages.
"Play/Stop 3ds Max Autodesk Knowledge Network", Autodesk Inc., available online at <http://knowledge.autodesk.com/support/3ds-max/learn-explore/caas/CloudHelp/cloudhelp/2015/ENU/3DSMax/files/GUID-4DC44019-A6BA-40F4-B860-520AD1B16AB7-htm.html>, Dec. 17, 2014, 4 pages.
Ragan-Kelley et al., "The Lightspeed Automatic Interactive Lighting Preview System", ACM Transactions on Graphics, vol. 26, No. 3, Article 25, Jul. 2007, pp. 25.1-25.11.
"Robocopy.exe Robust File Copy Utility Version XP010", Microsoft Corporation, 2003, pp. 1-35.
Rössler et al., "Dynamic Shader Generation for Flexible Multi-Volume Visualization", IEEE Pacific Visualization Symposium, Mar. 2008, pp. 17-24.
Schmalstieg et al., "Modeling and Rendering of Outdoor Scenes for Distributed Virtual Environments", ACM VRST Lausanne Switzerland, 1997, pp. 209-215.
Sun Microsystems, "Reusing Scene Graphs", Java 3D API Specification, available at <http://docs.oracle.com/cd/E17802_01/j2se/javase/technologies/desktop/java3d/forDevelopers/j3dguide/SceneGraphSharing.doc.html>, Jun. 1999, pp. 1-11.
Supplemental Notice of Allowance received for U.S. Appl. No. 13/843,930, dated Apr. 14, 2017, 2 pages.
Techfuels, "The Lighting Scene in 3D Animation", available online at <http://www.techfuels.com/applications/9895-lighting-scene-3d-animation.html>, retrieved on Apr. 30, 2013, 3 pages.
Tobler, Robert F.., "Separating Semantics from Rendering: A Scene Graph based Architecture for Graphics Applications", Visual Computer, vol. 27, 2011, pp. 687-695.
Toon Boom Animation, "Lighting Effects", available online at <http://beta.toonboom.com/home-users/toon-boom-studio/resources/tips-and-tricks/lighting-effects>, retrieved on Apr. 30, 2013, 2 pages.
Van Der Beek, Jelle, "Dependency Graphs in Games", Gamasutra—The Art & Business of Making Games, available at <http://www.gamasutra.com/view/feature/131221/dependency_graphs_in_games.php?print=1>, retrieved on Apr. 30, 2013, 15 pages.
Walker, A.C. J., "CGTalk—Viewing Animation in Multiple Viewports", CGSociety, available online at <http://forums.cgsociety.org/archive/index.php?t-512252.html>, Jun. 28, 2007, 3 pages.
Watt et al., "LibEE: A Multithreaded Dependency Graph for Character Animation", Proceedings of the Digital Production Symposium, 2012, pp. 59-66.
"WebKit Coordinated Graphics System", available, online at <http://trac.webkit.org/wiki/CoordinatedGraphicsSystem>, retrieved on Apr. 30, 2013, 9 pages.
Wernecke, Josie, "The Inventor Mentor: Programming Object-Oriented 3D Graphics with Open Inventor™, Release 2", Addison-Wesley Publishing Company, Chapter 3. Nodes and Groups, 1994, 20 pages.
Young et al., "Cantata: Visual Programming Environment for the Khoros System", Computer Graphics. ACM. US. vol. 29. No. 2, May 1995, pp. 22-24.
Intention to Grant received for European Patent Application No. 14160117.9, dated Jul. 5, 2017, 8 pages.
Office Action Received for Chinese Patent Application No. 201480000143.0, dated May 2, 2017, 13 pages (6 pages of English Translation and 7 pages of Official Copy).
Office Action received for European Patent Application No. 14160119.5, dated May 12, 2017, 4 pages.
Supplemental Notice of Allowance received for U.S. Appl. No. 13/843,695, dated Jul. 5, 2017, 9 pages.

\* cited by examiner

From camera 107

From camera 105

MULTIPLE VISUAL REPRESENTATIONS OF LIGHTING EFFECTS IN A COMPUTER ANIMATION SCENE

CROSS REFERENCE TO RELATED APPLICATIONS

This application is a continuation of U.S. application Ser. No. 13/843,980, filed Mar. 15, 2013, which is hereby incorporated by references in its entirety.

BACKGROUND

1. Field

The present disclosure relates generally to computer animation, and more specifically to tools for viewing the effects of lighting in computer animation.

2. Description of Related Art

The creation of a computer animation title involves many processes. To begin with, a computer-generated character (or other computer animation asset) is typically defined through a "rigging" process, during which a skeleton structure for the character is configured, followed by a "skinning" process, during which external features—skin, clothes, hair, for example—are given to the character. In addition, in a process called "surfacing," visible surfaces of the character are assigned synthesized materials so that the surfaces will appear with desired material properties in subsequent renderings of those surfaces. The defined character may then be placed with other computer animation assets (hereafter "animation assets") into a scene to play out a story line. Through an "animation" process, the various animation assets become configured to move about and/or interact with one another.

Thereafter, artists known as "lighters" configure the lighting parameters of various scenes so that the frames of computer animation that are to be rendered will appear realistic and visually pleasing to viewers. The configurable parameters of a light source may include placement, direction, intensity, and/or color of the light source. In addition, lighters may adjust the material properties of an animation asset in order to change its light reflection/transmission properties. After this "lighting" process, "rendering" takes place, during which shots of a scene are taken and frames of computer animation are produced.

As used here, the term "shot" refers to an interval during which a scene is captured by a virtual camera. An individual shot is typically defined by a transition, such as a cut or fade, at the beginning and end of the shot. The term "frame" refers to a still image. A shot can be rendered into any number of individual frames. A computer animation title is essentially made up of a series of frames that are rendered from different shots and edited together. The frames, when viewed in rapid succession (e.g., above 10 frames per second), give viewers the perception of animation. When frames of computer animation have been rendered, artists review the rendered frames for quality and effect. The artists can implement changes in the inputs to any one of the upstream computer animation processes described above in order to finesse a computer-animated title.

BRIEF SUMMARY

In some embodiments, a computer-enabled method for viewing the effects of a lighting change in a scene in a computer animation comprises receiving, by one or more processors, a first user input representing a first camera viewpoint, where the first camera viewpoint provides a first perspective of the scene, where the scene is used to create the computer animation; receiving, by the one or more processors, a second user input representing a second camera viewpoint, where the second camera viewpoint provides a second perspective of the scene, where the first perspective and the second perspective are different; receiving, by the one or more processors, a third user input representing configuration of a light source, where the light source affects a visual characteristic of the scene; rendering a first visual representation of the scene, based on the placement of the light source, from the first camera viewpoint; rendering a second visual representation of the scene, based on the placement of the light source, from the second camera viewpoint; and displaying the first visual representation and the second visual representation of the scene on a display screen.

In some embodiments, a non-transitory computer-readable storage medium has computer-executable instructions, where the computer-executable instructions, when executed by one or more processors, cause the one or more processors to provide a user interface for viewing the effects of a lighting change that is made to a scene of a computer animation. The computer-executable instructions comprises instructions for: receiving a first user input representing a first camera viewpoint, where the first camera viewpoint provides a first perspective of the scene, where the scene is used to create the computer animation; receiving a second user input representing a second camera viewpoint, where the second camera viewpoint provides a second perspective of the scene, where the first perspective and the second perspective are different; receiving a third user input representing configuration of a light source, where the light source affects a visual characteristic of the scene; rendering a first visual representation of the scene, based on the placement of the light source, from the first camera viewpoint; rendering a second visual representation of the scene, based on the placement of the light source, from the second camera viewpoint; and causing a display of the first visual representation and the second visual representation of the scene on a display screen.

In some embodiments, a computer animation system comprises one or more processors operatively coupled to a display screen and an input device. The input device is configured to: receive a first user input representing a first camera viewpoint, where the first camera viewpoint provides a first perspective of the scene, where the scene is used to create the computer animation; receive a second user input representing a second camera viewpoint, where the second camera viewpoint provides a second perspective of the scene, where the first perspective and the second perspective are different; receive a third user input representing configuration of a light source, where the light source affects a visual characteristic of a scene of a computer animation. The one or more processors are configured to: render a first visual representation of the scene, based on the placement of the light source, from the first camera viewpoint; render a second visual representation of the scene, based on the placement of the light source, from the second camera viewpoint; and cause a display of the first visual representation and the second visual representation of the scene on the display screen.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Lighting is an important step in the creation of a computer animation title. During the lighting process, artists known as "lighters" adjust the lighting parameters of a scene in computer animation so that frames rendered from the scene will appear realistic and pleasing to viewers. Lighting is important because viewers of computer animations have innate expectations of, and even appreciation for, lighting effects. For example, viewers may expect a setting sun to cast long shadows. Furthermore, viewers may subconsciously appreciate the moods that are brought on by sunset. Lighting can thus impact the perceived quality of a computer animation title.

Lighting is a lengthy process because the many scenes of a computer animation title (from which shots are taken and frames are rendered) may each contain various light sources that require individual tweaking. Unfortunately, adjustments to the parameters of one light source that improve the quality of one frame of (some shot of) computer animation can worsen the quality of another frame (in the same shot or in some other shot). Consider, for instance, the rendering of a series of frames that leverages shots from two different virtual cameras. If a light source is misaimed, in that it shines directly toward one of the two virtual cameras, then the light source would blind one of the two virtual cameras. However, a lighter who is fine-tuning the light source using frames from the workable (i.e., not blinded) virtual camera may not be immediately aware of the negative impact elsewhere. As is often the case, it is only after the lighter has completed her work from the perspective of one virtual camera that she realizes the lighting changes have rendered other virtual camera(s) unworkable, meaning that shots created from the other virtual camera(s) are visually undesirable. The resulting need to reconfigure the lighting parameters exacerbates the difficulties of what is already a lengthy process.

Figure 1:
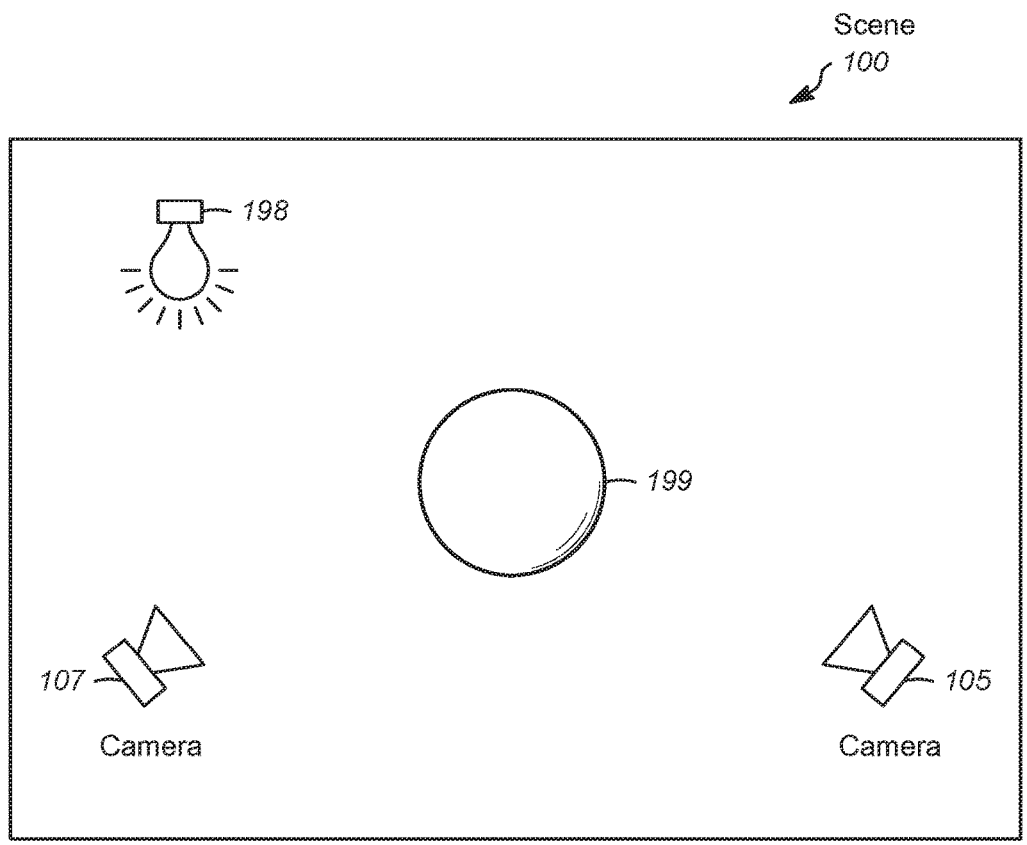
FIG. 1 depicts exemplary effects of lighting changes in computer animation.
Figure 1:
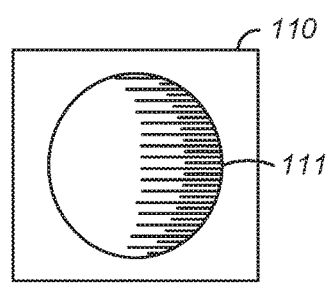
Figure 1:
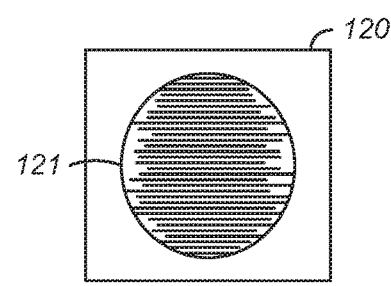

This problem is illustrated by FIG. 1. Scene 100, used in an exemplary computer animation, includes light source 198 and animation asset 199. An animation asset refers to an object in computer animation, such as a character, a car, a tree, a building, and the like. For the sake of simplicity, animation asset 199 is a sphere. Virtual cameras 105 (at the 5 o'clock position) and 107 (at the 7 o'clock position) provide possible viewpoints for taking shots from scene 100. As used here, the term "viewpoint" refers to the positioning and/or aiming of a virtual camera, which effectively control the visual perspective of the shots that are to be taken by the virtual camera.

Two shots of computer animation are rendered based on scene 100—one shot based on virtual camera 107 and another shot based on virtual camera 105. Frame 110 represents an exemplary frame rendered from the viewpoint of virtual camera 107. As frame 110 shows, light source 198 provides partial illumination of sphere 111 (which is a visual representation of animation asset 199). A lighter may desire this partial illumination of sphere 111 for dramatic effect.

Frame 120 represents an exemplary frame of the other rendered shot, which is based on the viewpoint of virtual camera 105. In frame 120, sphere 121 (which is also a visual representation of animation asset 199) is substantially dark due to the opposing placement of light source 198 with respect to virtual camera 105. As a result, the surface features of animation asset 199 are not visible in sphere 121 in rendered frame 120. A lighter may find the lack of visible surface details of sphere 121 undesirable.

As is evident from the foregoing, while light source 198 provides desirable outcomes from one virtual camera, the light source is undesirable for use with another virtual camera. If a lighter configures light source 198 based on the output of virtual camera 107 (e.g., sphere 111), she may not realize that the lighting parameters have undesirable effects on frames rendered using shots from virtual camera 105. At best, the lighter may realize this deficiency after the fact and rework the parameters of light source 198, thereby incurring additional time and resources.

The embodiments described herein include tools for viewing, in multiple contexts, the effects of changes that are made to a computer animation. For the sake of simplicity, examples are discussed below with reference to the viewing of lighting effects in computer animation from multiple virtual camera viewpoints. However, the embodiments are not limited to viewing only lighting changes. Instead, the viewing of other computer animation effects, for example the effects of surfacing changes of an animation asset, is possible. Furthermore, the embodiments are not limited to viewing computer animation effects from only (different) virtual camera viewpoints. Instead, the viewing of computer animation effects in other contexts, for example in the context of different configuration versions of a computer-generated character rig, is also possible. That is, the embodiments described herein may be used, e.g., to view the effects of surface changes to different configuration versions of an animation asset.

Figure 2:
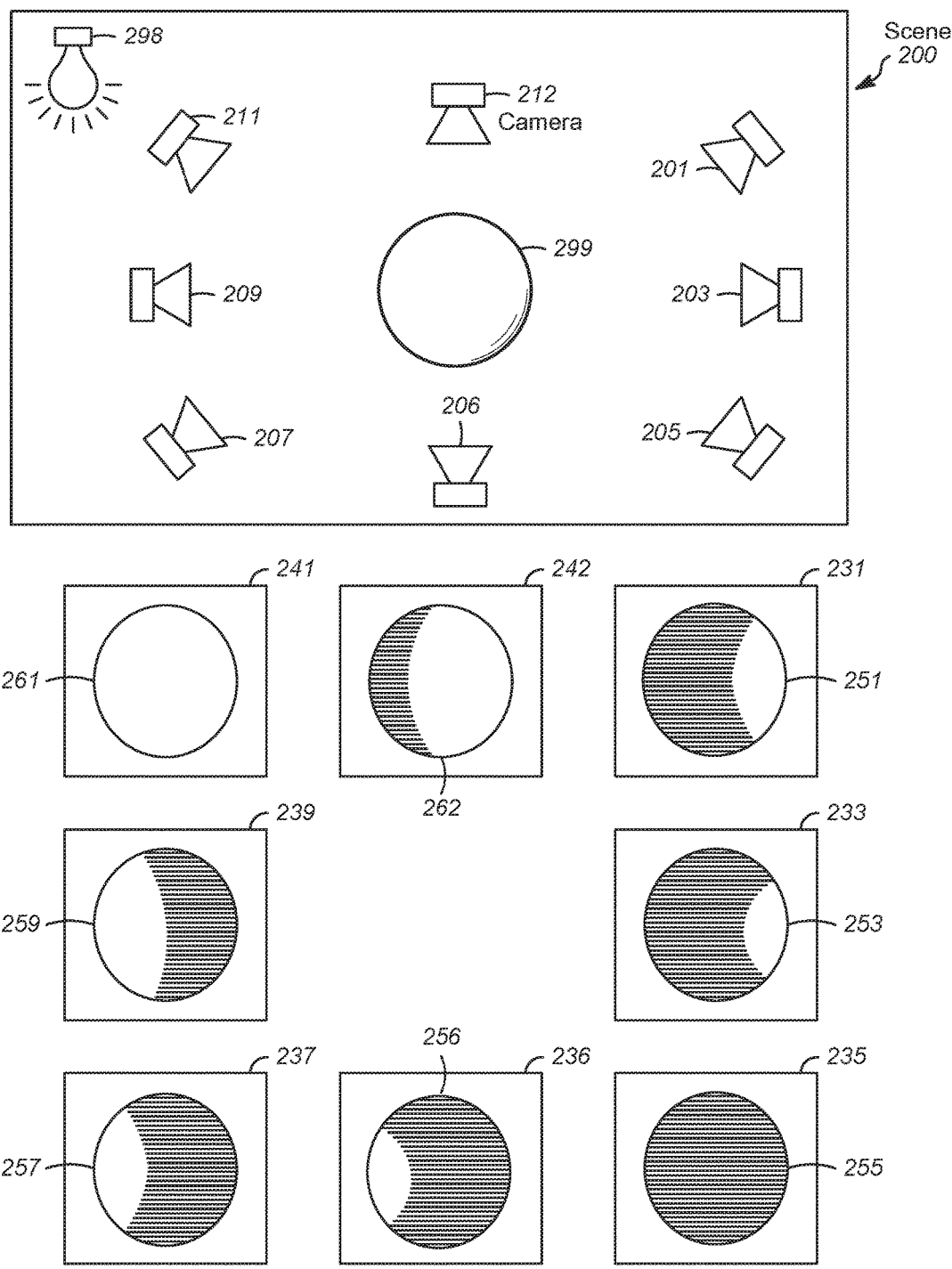
FIG. 2 depicts exemplary effects of lighting changes in computer animation.

With reference to FIG. 2, consider exemplary scene 200, which may be used to create a computer animation title. Scene 200 includes light source 298 and animation asset 299. Animation asset 299 is a sphere. A number of virtual cameras surround scene 200 to provide various viewpoints that may be used in the rendering of frames from scene 200. More specifically, shots from virtual cameras 201, 203, 205, 206, 207, 209, 211, and 212 may be used to render frames 231, 233, 235, 236, 237, 239, 241, and 242, respectively.

Light source 298 gives different effects to the different rendered frames. For instance, in frame 241, sphere 261 (which is a visual representation of animation asset 299) is substantially illuminated, while in frame 235, sphere 255 (which is also a visual representation of animation asset 299) is substantially dark, leaving only a silhouette of the sphere. The illuminations of the remaining exemplary frames vary between the bookends of illumination set forth by frames 241 and 235.

If frames 231, 233, 235, 236, 237, 239, 241, and/or 242 are displayed to a lighter while she adjusts light source 298, the lighter would be immediately informed of the possible effects of her particular lighting adjustments on the various other shots of scene 200. This information would be beneficial to the lighter because a change that negatively impacts another shot that is of interest to the lighter can be immediately corrected. Put another way, if a lighter is informed of the (positive and negative) effects of her lighting changes, she may adjust the lighting changes as necessary and thereby reduce the need for later rework.

Figure 3:
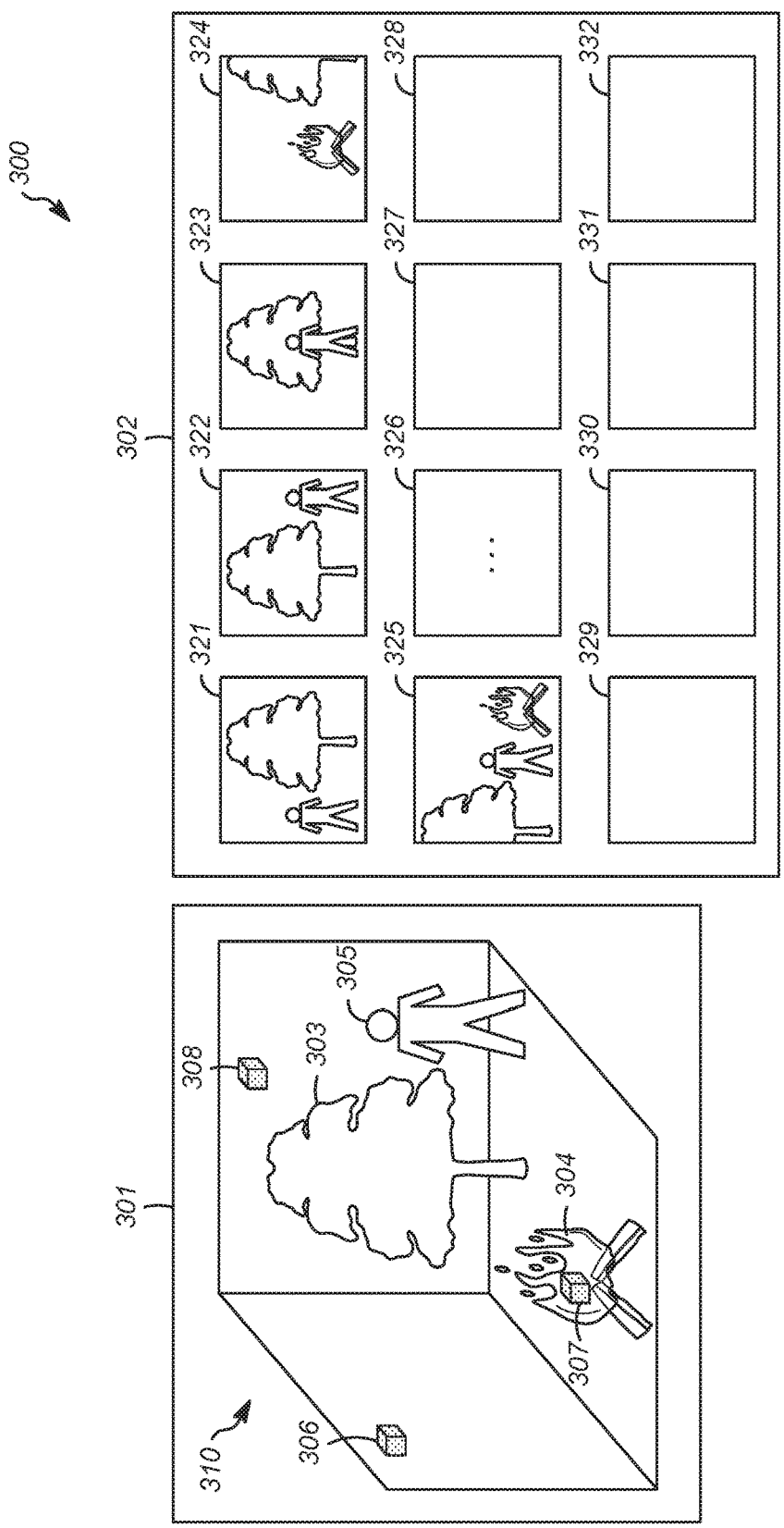
FIG. 3 depicts an exemplary user interface for viewing the effects of lighting changes in computer animation.

FIG. 3 illustrates exemplary user interface 300 provided in some embodiments for viewing the effects of lighting changes. User interface 300 includes at least two regions—301 and 302, which each may be a window, a display screen, or a similar user interface container. Region 301 allows a lighter to interact with scene 310, which includes animation assets 303-305 and light sources 306-308. Animation assets 303, 304, and 305 correspond to a tree, a bonfire, and a computer-generated character, respectively.

Region 302 includes visual displays 321-332, each of which may show visual information from scene 310. The visual information that is shown in a visual display may be a single frame that is rendered from a shot of scene 310 using a particular virtual camera. For instance, visual display 321 depicts a single frame of computer animation, based on scene 310, from a particular virtual camera viewpoint. Visual display 322 depicts another frame of computer animation, based on the same scene, but from a different virtual camera viewpoint. Furthermore, the visual information that is shown in a visual display may be a series of frames (e.g., a short clip of computer animation) rendered from a scene. For instance, visual display 322 may show a series of frames that are rendered from one or more shots of scene 310 taken by one or more virtual cameras.

Visual displays 321-332 are user-configurable, meaning that a lighter may define the information that is to be displayed in any one of the visual displays. For example, a lighter may configure whether a visual display is to show a single frame or a multiple frames of computer animation. A lighter may also control the virtual camera(s) and corresponding viewpoint(s) that are to be used by a visual display, meaning that a lighter may configure a visual display to show information from the contexts of particular viewpoint(s) of one or more particular virtual cameras. Furthermore, as discussed above, in addition to the use of different viewpoints as contexts, a lighter may configure different visual displays to show frames in other contexts, such as frames from different scenes, render passes, different configuration versions of animation assets, and/or different variations of animation assets. Thus, using user interface 300, a lighter can change lighting parameters via region 301 and view the effects of those lighting changes on different frames of computer animation displayed side-by-side in region 302. In this way, the lighter may determine if the lighting changes are desirable.

Notably, user-configurable visual displays that support the viewing of animations assets under multiple contexts provide artists with tremendous flexibility. Consider, for instance, an artist who is fine-tuning the visual appearance of the green skin-tone of a computer-generated ogre. The artist would benefit from being able to, e.g., see the visual appearance of the ogre under the contexts of different configuration versions of the ogre. The different configuration versions may cause the ogre to appear with different shades of green. The artist would also benefit from being able to, e.g., see the ogre under the contexts of different scenes. The different scenes may provide shots that show the ogre in different poses, indoors and outdoors. The ability to view the visual appearance of the ogre under these exemplary contexts, side-by-side, would assist the artist in fine-tuning the ogre's appearance for use in a computer animation title.

Figure 4:
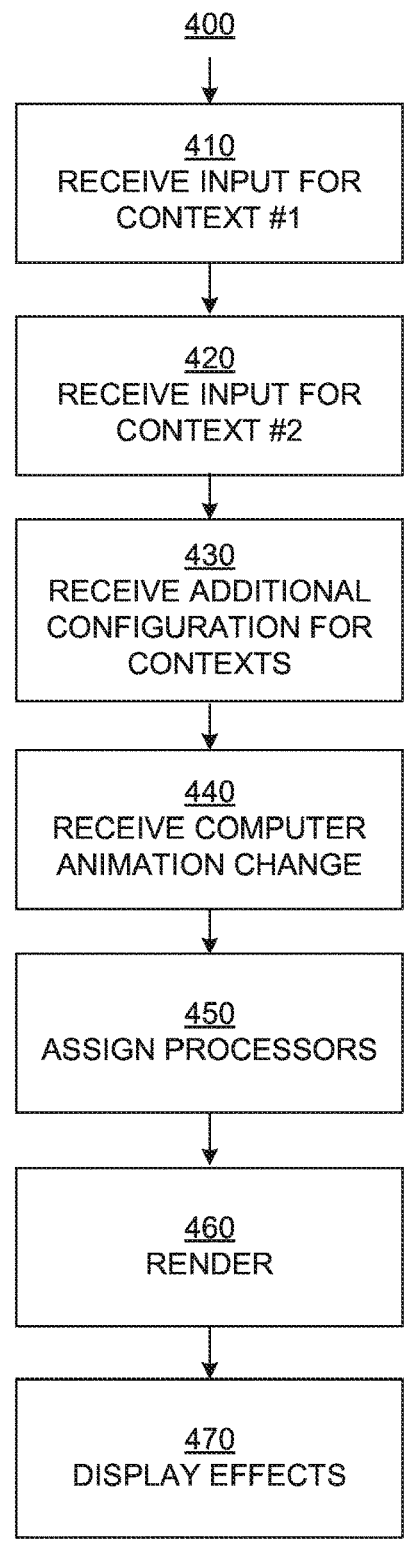
FIG. 4 depicts an exemplary process for viewing the effects of lighting changes in computer animation.

FIG. 4 illustrates exemplary process 400 performed in some embodiments to view the effect of lighting changes in computer animation. Before the effects of lighting changes can be viewed, one or more visual displays such as visual displays 321-332 (FIG. 3) need to be defined. At block 410, user input regarding the definition of a first visual display is received. The received information may reference a scene, and a first virtual camera and its viewpoint. At block 420, user input regarding the definition of a second visual display is received. The received information may reference a scene, and a second virtual camera and its viewpoint.

At block 430, information regarding the particular interval of computer animation that is to be displayed by the visual displays is received. A visual display may display a particular frame of computer animation at a given timestamp, or particular frames of computer animation for a given time span. If multiple visual displays are configured to display multiple frames of computer animation (e.g., a short clip), the visual displays may be further configured to display corresponding frames in a synchronized fashion, meaning that frames having the same timestamp (in the different visual displays) are displayed at the same time.

At block 440, changes to the parameters of a light source are received. At block 450, computer processors (or fractions thereof, such as one or more processor cores) are assigned to perform the rendering of the first and second visual displays. The processors that are assigned to render different visual displays may be different. The assignment may be based on available processors, the power of available processors, the complexity of the scene being shot, the complexity of the frames being rendered, and/or the amount of information that is to be displayed in each visual display (e.g., the rendering and display of a single frame requires fewer computing resources than what is required for a shot of multiple frames). At block 460, the assigned processors are used to render the visual information that is to be displayed in the first and second visual displays. At block 470, the rendered information is displayed for a lighter's analysis.

Figure 5:
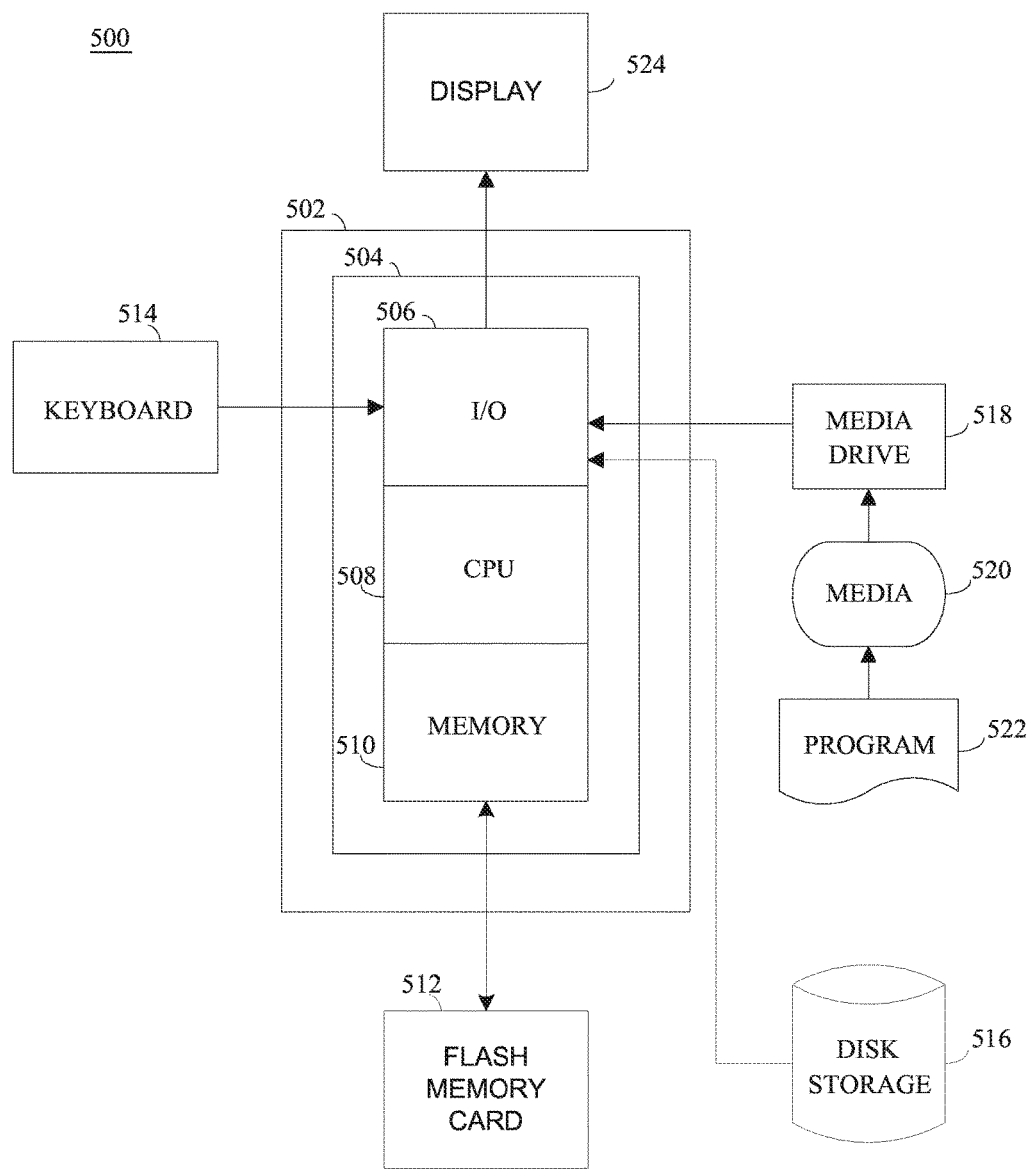
FIG. 5 depicts an exemplary computing system.

FIG. 5 depicts computing system 500 with a number of components that may be used to perform the above-described processes. The main system 502 includes a motherboard 504 having an I/O section 506, one or more central processing units (CPUs) 508, and a memory section 510, which may have a flash memory card 512 related to it. The I/O section 506 is connected to a display 524, a keyboard 514, a disk storage unit 516, and a media drive unit 518. The media drive unit 518 can read/write a computer-readable medium 520, which can contain programs 522 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. As discussed above, the embodiments may also be used with other computer animation processes. For example, during the surfacing process, artists known as "surfacers" define the material property of an animation asset, such as color, texture, and other physical components that drive the visual characteristics of the animation asset. Surfacers, like lighters, can benefit from being able to view the effects of their work through different contexts. Likewise, other artists, such as character rig designers and animators, may also benefit from being able to view their work through multiple contexts (especially where lighting effects interact with the character performance). Thus, the exemplary embodiments discussed above may be modified for use with other computer animation processes. Furthermore, aspects of embodiments disclosed above can be combined in other combinations to form additional embodiments. All such modifications are intended to be included within the scope of this technology.

What is claimed is:

1. A computer-implemented method for viewing a change that is made to a scene of a computer animation, the method comprising:
   receiving a first user input representing selection of a first visual characteristic for an animation asset in the scene of the computer animation;
   receiving a second user input representing selection of a second visual characteristic for the animation asset in the scene of the computer animation, wherein the first visual characteristic and the second visual characteristic are different;
   rendering a first frame of the scene, from a first virtual camera position, based on the first visual characteristic but not the second visual characteristic, wherein the first frame includes the animation asset with the first visual characteristic;
   rendering a second frame of the scene, from a second virtual camera position, based on the second visual characteristic but not the first visual characteristic, wherein the second frame includes the animation asset with the second visual characteristic;
   concurrently displaying the first frame and the second frame;
   receiving a third user input representing selection of a third visual characteristic for the animation asset in the scene of the computer animation;
   rendering a third frame of the scene from the first virtual camera position; and
   concurrently displaying the third frame and the second frame.

2. The method according to claim 1, wherein receiving the third user input representing selection of the third visual characteristic comprises receiving a change to the first visual characteristic.

3. The method according to claim 2, further comprising:
   concurrently displaying the first frame, the second frame, and the third frame.

4. The method according to claim 1, wherein the first visual characteristic is a first configuration version of a character rig of the animation asset, and wherein the second visual characteristic is a second configuration version of a character rig of the animation asset.

5. The method according to claim 1, wherein the first visual characteristic and the second visual characteristic for the animation object each include at least one of: a texture parameter, a surface parameter, a color parameter, a shading parameter, and a shape of the animation asset.

6. The method according to claim 1, wherein the first visual characteristic and the second visual characteristic for the animation object each include at least one of: a direction, an intensity, and a color of a light source.

7. The method according to claim 1, further comprising:
   rendering a first plurality of frames of the scene from the first virtual camera position, wherein the first plurality of frames includes the first frame;
   rendering a second plurality of frames of the scene from the second virtual camera position, wherein the second plurality of frames includes the second frame; and
   wherein concurrently displaying the first frame and the second frame comprises concurrently displaying the first plurality of frames and the second plurality of frames.

8. The method according to claim 1, wherein the scene of the computer animation is a first scene, and wherein concurrently displaying the first frame and the second frame further comprises:
   concurrently displaying the first frame, the second frame, and a fourth frame,
      wherein the fourth frame is a rendered frame of a second scene of the computer animation, different than the first scene, and
      wherein the fourth frame includes the animation asset.

9. The method according to claim 1, wherein the third frame includes the animation asset with the third visual characteristic.

10. The method according to claim 9, wherein the third frame includes the animation asset with the first visual characteristic.

11. A non-transitory computer-readable storage medium having computer-executable instructions, wherein the computer-executable instructions, when executed by one or more processors, cause the one or more processors to provide a user interface for viewing a change that is made to a scene of a computer animation, the computer-executable instructions comprising instructions for:
   receiving a first user input representing selection of a first visual characteristic for an animation asset in the scene of the computer animation;
   receiving a second user input representing selection of a second visual characteristic for the animation asset in the scene of the computer animation, wherein the first visual characteristic and the second visual characteristic are different;
   rendering a first frame of the scene, from a first virtual camera position, based on the first visual characteristic but not the second visual characteristic, wherein the first frame includes the animation asset with the first visual characteristic;
   rendering a second frame of the scene, from a second virtual camera position, based on the second visual characteristic but not the first visual characteristic, wherein the second frame includes the animation asset with the second visual characteristic;
   concurrently displaying the first frame and the second frame;
   receiving a third user input representing selection of a third visual characteristic for the animation asset in the scene of the computer animation;
   rendering a third frame of the scene from the first virtual camera position; and
   concurrently displaying the third frame and the second frame.

12. The computer-readable storage medium according to claim 11, wherein receiving the third user input representing selection of the third visual characteristic comprises receiving a change to the first visual characteristic.

13. The computer-readable storage medium according to claim 12, wherein the computer-executable instructions further comprise instructions for:
concurrently displaying the first frame, the second frame, and the third frame.

14. The computer-readable storage medium according to claim 11, wherein the first visual characteristic is a first configuration version of a character rig of the animation asset, and wherein the second visual characteristic is a second configuration version of a character rig of the animation asset.

15. The computer-readable storage medium according to claim 11, wherein the first visual characteristic and the second visual characteristic for the animation object each include at least one of: a texture parameter, a surface parameter, a color parameter, a shading parameter, and a shape of the animation asset.

16. The computer-readable storage medium according to claim 11, wherein the first visual characteristic and the second visual characteristic for the animation object each include at least one of: a direction, an intensity, and a color of a light source.

17. The computer-readable storage medium according to claim 11, wherein the computer-executable instructions further comprise instructions for:
rendering a first plurality of frames of the scene from the first virtual camera position, wherein the first plurality of frames includes the first frame;
rendering a second plurality of frames of the scene from the second virtual camera position, wherein the second plurality of frames includes the second frame; and
wherein concurrently displaying the first frame and the second frame comprises concurrently displaying the first plurality of frames and the second plurality of frames.

18. The computer-readable storage medium according to claim 11, wherein the scene of the computer animation is a first scene, and wherein concurrently displaying the first frame and the second frame further comprises:
concurrently displaying the first frame, the second frame, and a fourth frame,
wherein the fourth frame is a rendered frame of a second scene of the computer animation, different than the first scene, and
wherein the fourth frame includes the animation asset.

19. The computer-readable storage medium according to claim 11, wherein the third frame includes the animation asset with the third visual characteristic.

20. The computer-readable storage medium according to claim 19, wherein the third frame includes the animation asset with the first visual characteristic.

21. A computer animation system, the system comprising:
one or more processors operatively coupled to a display screen and an input device,
wherein the input device is configured to:
receive a first user input representing selection of a first visual characteristic for an animation asset in the scene of the computer animation;
receive a second user input representing selection of a second visual characteristic for the animation asset in the scene of the computer animation, wherein the first visual characteristic and the second visual characteristic are different;
render a first frame of the scene, from a first virtual camera position, based on the first visual characteristic but not the second visual characteristic, wherein the first frame includes the animation asset with the first visual characteristic;
render a second frame of the scene, from a second virtual camera position, based on the second visual characteristic but not the first visual characteristic, wherein the second frame includes the animation asset with the second visual characteristic;
concurrently display the first frame and the second frame;
receive a third user input representing selection of a third visual characteristic for the animation asset in the scene of the computer animation;
render a third frame of the scene from the first virtual camera position; and
concurrently display the third frame and the second frame.

22. The system according to claim 21, wherein receiving the third user input representing selection of the third visual characteristic comprises receiving a change to the first visual characteristic.

23. The system according to claim 22, wherein the one or more processors are further configured to:
concurrently display the first frame, the second frame, and the third frame.

24. The system according to claim 21, wherein the first visual characteristic is a first configuration version of a character rig of the animation asset, and wherein the second visual characteristic is a second configuration version of a character rig of the animation asset.

25. The system according to claim 21, wherein the first visual characteristic and the second visual characteristic for the animation object each include at least one of: a texture parameter, a surface parameter, a color parameter, a shading parameter, and a shape of the animation asset.

26. The system according to claim 21, wherein the first visual characteristic and the second visual characteristic for the animation object each include at least one of: a direction, an intensity, and a color of a light source.

27. The system according to claim 21, wherein the one or more processors are further configured to:
render a first plurality of frames of the scene from the first virtual camera position, wherein the first plurality of frames includes the first frame;
render a second plurality of frames of the scene from the second virtual camera position, wherein the second plurality of frames includes the second frame; and
wherein concurrently displaying the first frame and the second frame comprises concurrently displaying the first plurality of frames and the second plurality of frames.

28. The system according to claim 21, wherein the scene of the computer animation is a first scene, and wherein concurrently displaying the first frame and the second frame further comprises:
concurrently displaying the first frame, the second frame, and a fourth frame,
wherein the fourth frame is a rendered frame of a second scene of the computer animation, different than the first scene, and
wherein the fourth frame includes the animation asset.

29. The system according to claim 21, wherein the third frame includes the animation asset with the third visual characteristic.

30. The system according to claim 29, wherein the third frame includes the animation asset with the first visual characteristic.

* * * * *